United States Patent [19]

Alais

[11] 4,034,332

[45] July 5, 1977

[54] ULTRASONIC TRANSMITTING AND RECEIVING DEVICES USING DIELECTRIC TRANSDUCERS

[75] Inventor: Pierre M. Alais, Dampierre, France

[73] Assignee: Agence Nationale de Valorisation de la Recherche (ANVAR), Courbevoie, France

[22] Filed: Oct. 15, 1974

[21] Appl. No.: 514,930

Related U.S. Application Data

[63] Continuation of Ser. No. 240,993, April 4, 1972, abandoned.

[52] U.S. Cl. .............................. 340/9; 73/67.5 H; 179/111 E; 307/88 ET; 340/511; 340/5 MP
[51] Int. Cl.² ................................. H04R 19/04
[58] Field of Search ............ 340/4, 5 H, 5 MP, 8 R, 340/9, 10, 12, 13, 14; 310/8.1, 9.5; 179/111 R, 111 E; 178/DIG. 10, DIG. 18; 307/88 ET; 73/67.5 R, 67.5 H

[56] References Cited

UNITED STATES PATENTS

| 1,759,811 | 5/1930 | Edelman | 179/111 E |
|---|---|---|---|
| 3,373,251 | 3/1968 | Seeler | 179/111 R |
| 3,445,824 | 5/1969 | Fulenwider | 307/88 ET |
| 3,543,248 | 11/1970 | Oliver | 307/88 ET |
| 3,604,251 | 9/1971 | Dixon | 179/111 R X |
| 3,678,452 | 7/1972 | Silverman | 340/5 H X |
| 3,719,922 | 3/1973 | Lopes, Jr. et al. | 340/5 MP |
| 3,736,436 | 11/1971 | Crites | 307/88 ET |
| 3,736,552 | 5/1973 | Sessler et al. | 340/5 H X |
| 3,771,116 | 11/1973 | Farrah | 340/5 H |

Primary Examiner—Harold Tudor

[57] ABSTRACT

The device for transmitting or receiving ultrasonic waves or pulses to and from well-defined adjustable directions or distances includes a capacitive transducer consisting of a layer of dielectric material tightly packed between two electrodes, one at least of which is formed of an appropriate array of elongated strips of circular or rectilinear shape.

7 Claims, 9 Drawing Figures

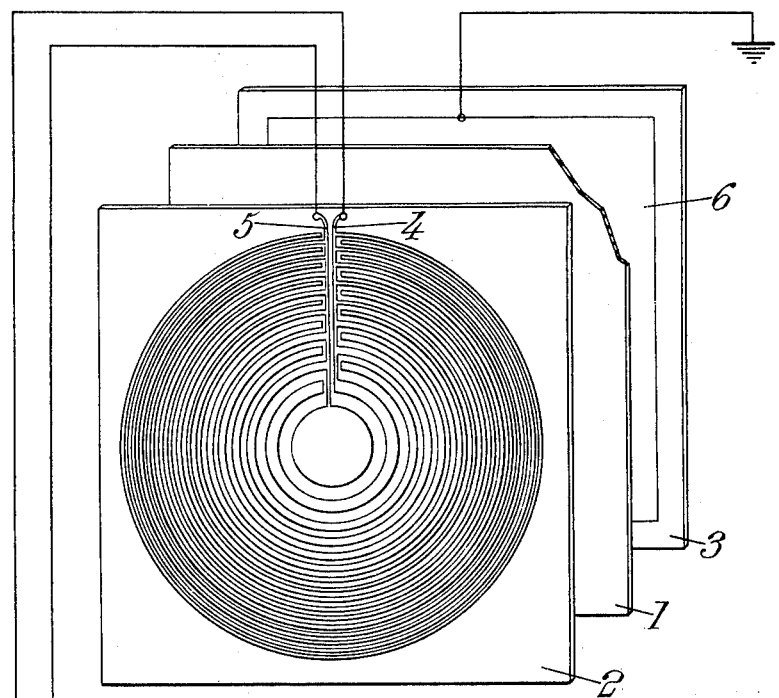
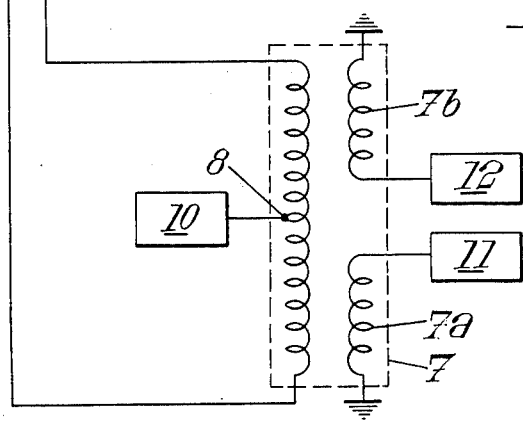
Fig. 2.

ULTRASONIC TRANSMITTING AND RECEIVING DEVICES USING DIELECTRIC TRANSDUCERS

This is a continuation of application Ser. No. 240,993, filed Apr. 4, 1972, now abandoned.

BACKGROUND OF THE INVENTION

This invention relates to devices for transmitting ultrasonic wave pulses into an outer liquid or solid medium while focusing said pulses in predetermined and adjustable directions or distances and/or for detecting such wave pulses.

Prior art ultrasonic transducers have been of the magnetostrictive type, using crystal or ceramic piezo-electric material. Such transducers have proved not to be entirely adapted to fast scanning, particularly due to low internal dampening. As a consequence, the recurrence time in angular scanning has been too long for a number of applications.

Transducers using dielectric material have also been used in earphones. But the electrostatic material constitutes a thin flexible diaphragm mounted between two fixed conductive plates with an air-gap reserved for vibration of the diaphragm. In other words, use is made of flexiblity of the dielectric rather than of its internal compressiblity. The resonance frequencies of such systems are too low for use as ultrasonic transducers of acceptable performance.

SUMMARY OF THE INVENTION

It is an object of the invention to provide a device for transmitting or receiving ultrasonic waves or pulses including a transducer which exhibits high dampening characteristics, whereby a very broad pass band is attached.

It is another object of the invention to provide an electrostatic transducer adapted to deliver or receive pulses of ultrasonic waves into and from well-defined and adjustable directions.

It is another object of the invention to provide ultrasonic wave pulses which are focused at a predetermined and adjustable distance from the transducer.

It is an ancillary object of the invention to provide systems which enable fast spatial scanning.

For this purpose, there is provided a device adapted to transmission or reception of ultrasonic wave pulses, comprising a transducer consisting of a thin sheet of dielectric material tightly packed over its whole active surface in contact with and between the surfaces of an insulating backing plate and a thin insulating protective plate adapted to separate the dielectric material from the ultrasonic transmitting medium. Parts at least of the surfaces of both plates in contact with said dielectric material are electrically conductive. The conductive surface of said backing plate at least is fractioned to constitute at least one array of several conductive strips. The transducer is associated with an electric circuit for energization of said electrodes, the shape and arrangement of the electrodes and the electric circuitry being designed for providing a predetermined transmission or reception wave pattern.

Other objects of the invention will appear from the following description of preferred embodiments thereof, given by way of non-limitative examples.

BRIEF DESCRIPTION OF THE DRAWINGS

The description will refer to the accompanying drawings, wherein:

FIG. 2, similar to FIG. 1, is a view of a device whose transducer is adapted to focus the energy of ultrasonic pulses at a predetermined and adjustable distance;

DETAILED DESCRIPTION OF THE PREFERRED EMBODIMENTS

Figure 1:
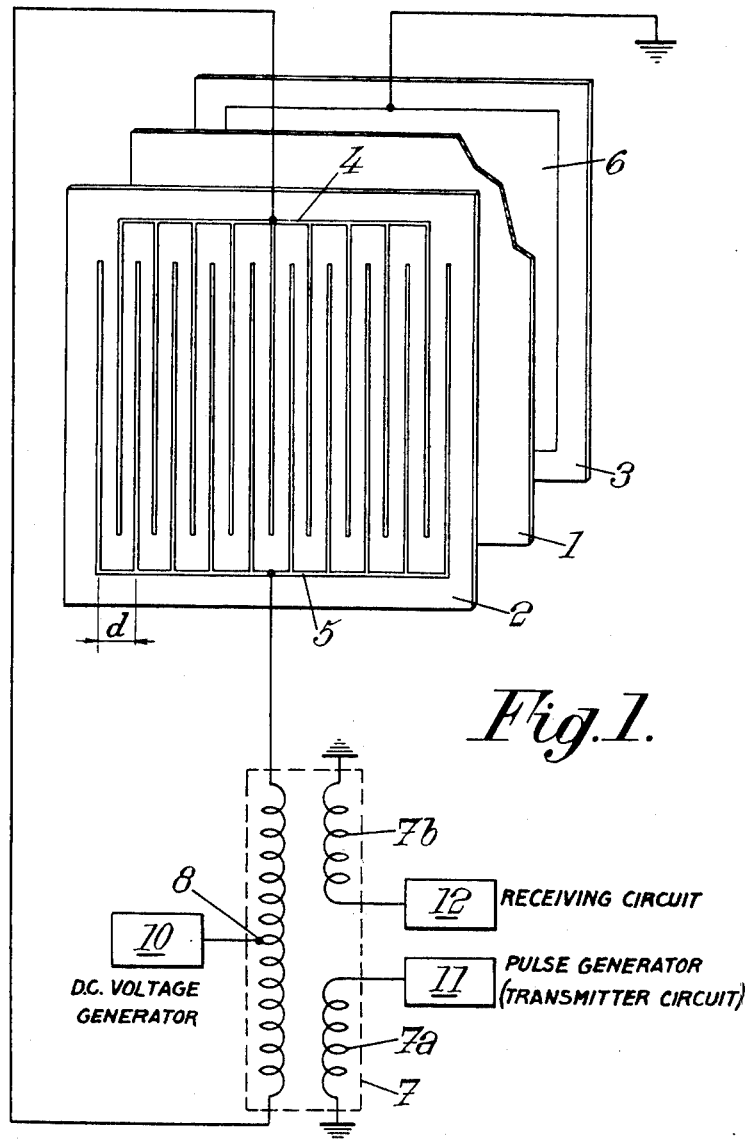
FIG. 1 is a schematic view of a device according to a first embodiment of the invention, including a transducer adapted to transmit ultrasonic wave pulses in the form of lobes at a predetermined and adjustable angle with the mid-plane of the transducer and to receive the echoes from such lobes.

Referring first to FIG. 1, there is shown a transmitting and receiving device which may be regarded as consisting of a transducer and of an associated electric circuitry. The transducer is shown with the components thereof in disassembled condition. Once assembled, it is suitable for use in transmitting ultrasonic wave pulses into a liquid or solid medium and in receiving the echoes, the transmitted waves constituting a lobe whose direction may be varied by adjusting the frequency provided by the circuitry which energizes the transducer. The device is particularly suitable for use as a real time scanning system of the type currently known as a "sonar" up to distances of about 150 ft., with the advantage on conventional sonar systems that operation may be regarded as being in real time due to the rate of scanning, which may attain or even exceed 20 full scans per second.

The transducer of FIG. 1 comprises a thin sheet 1 of dielectric material wihch is preferably a polyimide such as that designated by the trademark "Kapton." Sheet 1 is clamped between a backing plate 2 and a protecting plate 3 retained by securing means (not shown). The protective plate is provided on its inner surface in contact with the sheet 1 with an electrically conductive layer 6 which constitutes a first electrode. The main purpose of the protective plate is to separate the electrode 6 from the outside medium. Plate 3 should be so thin as not to absorb ultrasonic energy to a substantial extent. The backing plate 2 is rigid and includes on its inner surface in contact with sheet 1 a composite electrode, which was illustrated on the back of the plate on FIG. 1 for clarity only. The electrode on backing plate consists of two interlaced arrays 4 and 5, each consisting of a plurality of equally spaced parallel strips of metal. All strips of a same array are connected in parallel.

The backing plate may be constituted of a conventional printed circuit plate some millimeters thick, of a glass fiber — resin composite. The electrode may be formed from a layer some microns thick of metal deposit which is later partially etched away by a conventional procedure. The protective plate should be flexible and thin; use may be made of a sheet of "Mylar" or "Kapton" some microns thick, with the electrode 6 in the form of a metal deposit about 1 micron thick. The dielectric sheet 1 may be constituted of "Kapton" with a thickness in the 15 – 20 microns range.

The circuitry associated with the transducer of FIG. 1 is designed for driving the two arrays out of phase of 180°. It includes a high frequency transformer whose secondary coil has two end terminals each connected to a respective one of the arrays 4 and 5. A middle terminal of the secondary coil 8 is brought to a high voltage with respect to ground by a D C generator 10. As appears on FIG. 1, the two arrays 4 and 5 are thus maintained at a high voltage with respect to the electrode 6 which is grounded.

Two primary coils are associated with the secondary coil 8. A first primary 7a has its terminals respectively connected to ground and to a pulse generator, which constitutes the circuit for energizing the transducer and for enabling it to act as a transmitter. The second primary 7b has its two terminals respectively grounded and connected to a receiving circuit 12 of conventional design. Although two primary coils 7a and 7b have been illustrated on FIG. 1, there is no obligation to use separate coils associated with the transmitter circuit and receiving circuit, respectively. This is however preferable since it renders tuning easier.

The transducer of FIG. 1, once energized by a pulse generator at a frequency $f$, delivers a narrow flat lobe of ultrasonic wave. The angle $\theta$ between the direction of the main lobe and a plane orthogonal to the electrode arrays 4 and 5 and parallel to the strips is given by the relation : $\sin \theta = c/fd$.

In the above relation $d$ is the distance between successive strips of a same array, $c$ is the speed of sound in the medium where the ultrasonic waves are introduced.

In a particular embodiment of the invention, the sheet 1 was 25 microns thick and was made of "Kapton". The backing plate was a plate 5 mm thick of a glass fiber-epoxy composite. The distance $d$ was 7 mm. The protecting plate 3 was a "Mylar" sheet sealingly connected to the backing plate and covered on its internal surface with a thin layer of aluminum or copper. The over-all size of the transducer was 21 × 27 cm. The pulse generator was adapted to operate at frequencies between 250 and 500 kc/sec, thereby providing lobes at an angle between 30° and 60°. The 30° angle was scanned within a very short time, responsive to frequency modulation of the pulse generator. Twenty scans per second were readily achieved, that is a recurrence frequency much higher than that of a "Sonar" system using rotary transducers.

Referring now to FIG. 2, there is shown a transducer adapted to deliver a beam of ultrasonic waves focused at an adjustable distance. For more clarity, the components illustrated on FIG. 2 and which correspond to those of FIG. 1 are referred to by the same reference numerals.

The dielectric sheet 1 and protecting plate 3 are identical to those of the embodiment of FIG. 1. The backing plate 2 is provided with an electrode consisting of two concentric arrays of circular strips 4 and 5. The radial sizes and successive distances of the strips are so selected that each array constitutes the ultrasonic equivalent of an optical diffraction grating of the Soret type.

In the embodiment of FIG. 2, the circuitry associated with the electrodes is identical to that of FIG. 1. With such a circuitry, the operation of the system is as follows : the transmitter circuit 11 delivers short bursts or trains of substantially sinusoidal pulses at a frequency $f$. The corresponding ultrasonic waves from the arrays 4 and 5 focus or converge at a distance from the dielectric sheet which is a function of the frequency. The reflected waves are detected during the time period which separates two successive bursts and which should be so selected as to allow for direct and back travel of the waves to and from the focusing point. Determination of the amplitude of the echo provides an indication as to the existence of a discontinuity at the point where the waves focus. In depth scanning may be obtained by successively emitting bursts at different frequencies. At a result, the locations of discontinuities are detected as abrupt increases in the amplitude of the reflective waves. A particularly important application of the system consists in medical scanning of soft organs. Ultrasonic scanning improves upon X-ray tomography since it makes it possible to determine discontinuities which cannot be seen on a radiography. It improves upon neutrography and radioscintigraphy since it is harmless and removes the necessity of subjecting the patient to ionizing radiations.

As an example, it may be indicated that a transducer of the type illustrated in FIG. 2 was reduced to practice and operated with an over-all diameter of 20 cm. The thicknesses of the components were the same as in the embodiment of FIG. 1. The midfrequency of the ultrasonic waves was 1 Mc/sec and resulted in convergence of the waves at a location 30 cm away from the dielectric sheet. A frequency sweep resulted in a variation of the distance of the focus from 20 cm to 50 cm. The accuracy in a direction transverse to the direction of propagation of the waves was about 1 mm.

Figure 2A:
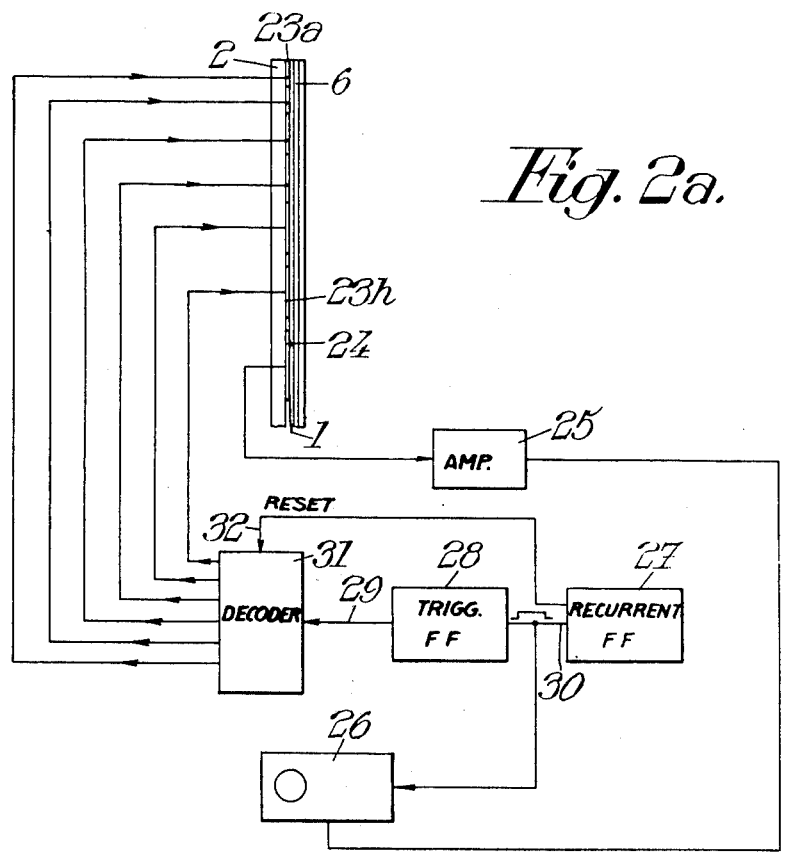
FIG. 2a is a schematic view of a device which constitutes a modification of that of FIG. 2, the transducer being shown in section along the diameter of the electrodes.

The transducer illustrated in FIG. 2 may also be operated with a transmitting circuit providing single pulses which each exhibits a Fourier spectrum in a wide frequency range. There is then no focusing of the waves at a single point, but rather a resultant caustic of elongated shaped along the axis of the transducer. By measuring the time period elapsed between the time of emission of the ultrasonic pulse and the detection of an echo peak, it is possible to determine the distance at which the ultrasonic pulse has been reflected by an intervening discontinuity, assuming that the velocity of sound in the transmission medium is known with sufficient accuracy. Such a time measurement enables the depth of the discontinuity to be determined without any scanning, for instance by displaying the echo on the cathodic tube of an oscilloscope triggered by the transmission. However there is then the difficulty that the acoustic travel is not the same from all strips constituting an array and the peak is not sharp enough for accurate determination of the depth. This drawback is overcome if the embodiment illustrated on FIG. 2a is used.

For more clarity, the components of the transducer of FIG. 2a which correspond to those illustrated on FIG. 2 are designated by the same reference numerals.

The transducer of FIG. 2a again comprises a backing plate 2, a dielectric layer 1 and a protecting plate 3. The protecting plate 3 carries a continuous electrode 6 on its inner surface. On the contrary, the backing plate 2 is provided with a single array of annular concentric conductive strips $23_a$, $23_b$ ... $23_n$. The strips are again located and sized so as to constitute the acoustic equivalent of an optical Soret grating. The central portion of the inner surface of the backing plate 2 is coated with a thin metal layer constituting a single receiving spot electrode.

Figure 5:
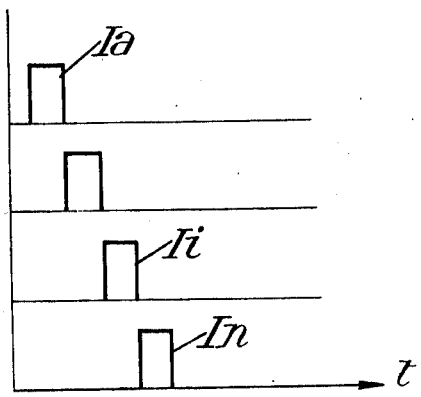
FIG. 5 is a diagram illustrating the time relationship of the pulses delivered to the electrodes of the transducer of FIG. 2a or FIG. 3.

In operation, all electrodes carried by the backing plate 2 are biased by a D.C. voltage generator (not shown) as the corresponding electrodes of the embodiment of FIG. 2. The receiving spot electrode 24 is connected to the input of an amplifier 25 which brings the signals to a proper level and feeds them to an oscilloscope 26. The transmitting circuit is adapted to deliver electric pulses to the electrodes $23_a$, $23_b$ ... $23_n$, in time sequence. Referring to FIG. 5, each horizontal line corresponds to a distinct annular strip and the pulses delivered to successive strips are separated by equal time periods. As a consequence, focusing will take place at different axial distances from the transducer depending upon the frequency which is supplied. The accuracy of the measurement will to some extent depend on the pulse width which determines the fundamental frequency of the ultrasonic waves. If there is a discontinuity or intervening object surface in the path of the ultrasonic beam and the distance between the transducer and the discontinuity is equal to the distance at which focusing or "compression" occur, an echo peak of higher amplitude will be received. Time gating or discrimination may be used for isolating the peak which corresponds to the time delay necessary for direct and back travel of the pulses to and from the focus for the ultrasonic frequency.

In lieu of being a central spot, the receiving electrode may be in the form of an annular electrode between two successive strips of the focusing array.

The circuitry associated with the transducer of FIG. 2a includes a recurrent multivibrator of flip-flop 27 which may be energized by manually actuated control means (not shown). The recurrence period of the flip-flop 27 is so selected that its output waves have a length which corresponds to the time necessary for scanning the transmission electrodes $23_a$, $23_b$ ... $23_n$. One of the outputs of the flip-flop 27 is connected to the energizing input of a triggered multivibrator 28 whose output frequency is so selected that n pulses are delivered on the output 29 during the time length of an output pulse delivered by flip-flop 27 on its output 30. The output 29 is connected to the input of a decoder or demultiplexer 31 which exhibits n outputs each connected to a separate one of the strips $23_a$, $23_b$ ... $23_n$. Decoder 31 is so arranged that the first pulse received from the multivibrator 28 after the decoder has been reset is delivered to the output connected to strip $23_a$, the second one is delivered to strip $23_b$, and so on.

The output Q of flip-flop 27 (which delivers a logical signal which is complementary of that of output $\overline{Q}$ 30 is connected to the reset input 32 of the decoder 31.

Operation of the device is clear from the above description: when the flip-flop 27 is set and its output 30 delivers a signal, the triggered multivibrator 28 is operating. Pulses are delivered to conductive strips $23_a$, $23_b$ ... $23_n$ in seriatim order. When flip-flop 27 is reset, a signal is delivered on output Q and resets the decoder. Output 30 of the recurrent flip-flop 27 is also connected to the oscilloscope 26 so that the front edge of the output signal triggers the saw-tooth generator. When an echo peak is received by electrode 24, it delivers a signal to the amplifier 25 which feeds the deflector plates of the cathodic tube of oscilloscope 26. The distance between the O point and the peak on the scope is a measure of the distance between the transducer and the intervening object. Since operation is completely recurrent, in-depth scanning is easily achieved by varing the frequency of triggered multivibrator 28. Transversal scanning is achieved by moving slowly the transducer transversely to its axis.

Since the construction and operation of the embodiment of FIGS. 3 and 4 may easily be understood from a comparison with those which have been described, a less complete description will be given. The same reference numerals are still used for designating corresponding elements on FIGS. 3 – 4 and on the preceding Figures. The backing plate 2, dielectric layer 1 and protecting plate 3 are broadly similar to those of FIG. 1. However, the protecting plate carries on its internal surface an array of parallel elongated conductive metal strips 14a ... 14j ... 14p. The backing plate 2 carries on its internal surface an array of metal strips similar to strips 14, but laying in a direction transverse thereto. A D.C. voltage generator 15 is connected to the strips 13a ... 13i ... 13n through switching means 16 which bring the strips to the D.C voltage one at a time, in seriatim order. As a consequence, that strip 13 which is connected to the D.C. voltage is the only one which cooperates with the strips 14a ... 14j ... 14p (maintained at ground D.C. potential) for subjecting the portion of the dielectric layer 1 between them to a field which results in reception of ultrasonic waves. Such a system is adapted to relatively slow scanning of the spatial field of ultrasonic waves received from an outside source, which may be a reflective object receiving ultrasonic pulses transmitted by another transducer (not shown): there are n × p zones Z of crossing conductors; the switch 17 maintains a particular "column" strip (14a for instance) connected to the amplifier 18, while switch 16 strobes all strips 13a ... 13n; it then disconnects strip 14a and connects the next strip, i.e. trip 14b, for the time necessary for scanning by switch 16. Operation may consequently be considered as continuous.

Figure 6A:
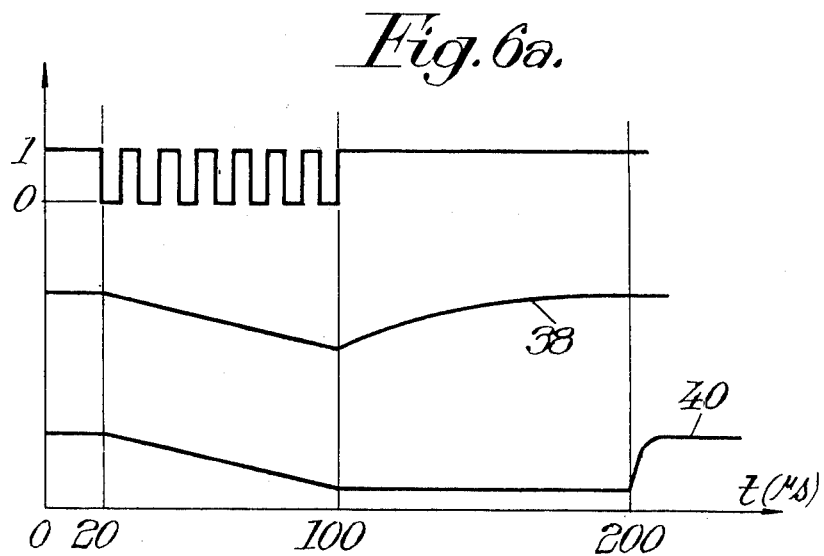
FIG. 6a is a diagram illustrating the time relationship between the signals in the device of FIG. 6.
Figure 6:
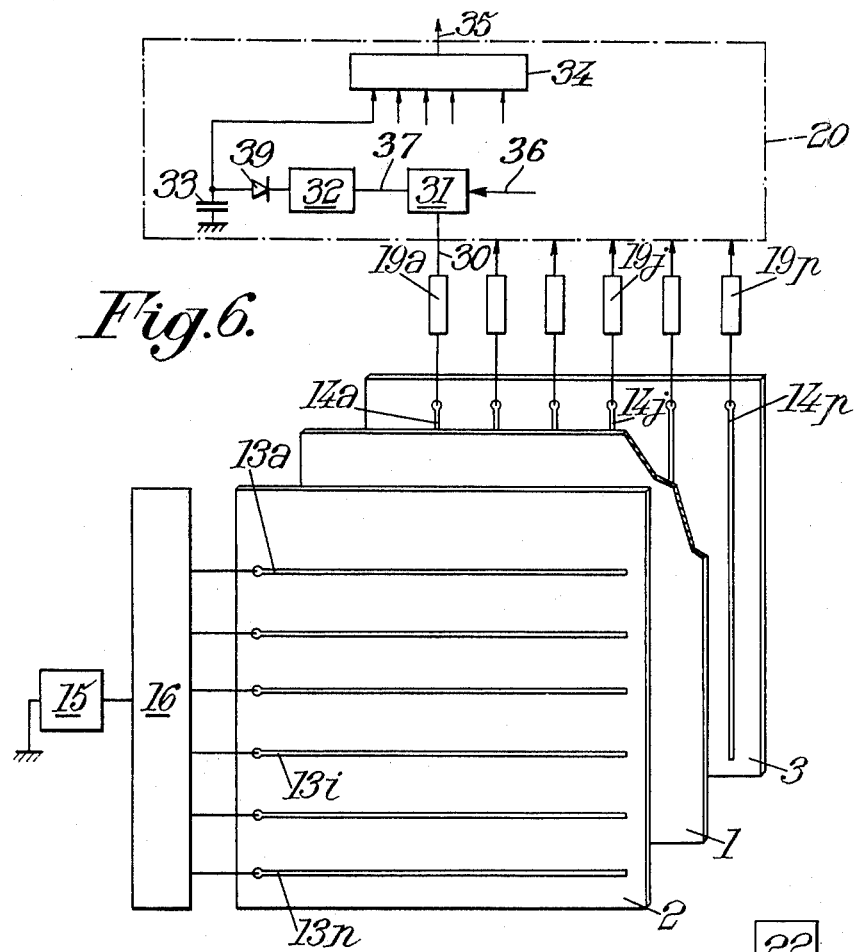
FIG. 6, similar to FIG. 3, is a view of a modified embodiment suitable for use as a receiving retina for fast scanning.

Referring to FIG. 6, there is shown a system for fast scanning of an ultrasonic wave field emitted by a source (not shown). In the embodiment of FIG. 6, the p strips on plate 3(p being an integer) referred to as 14a ... 14j ... 14p are connected to a corresponding number P of amplifiers 19a ... 19j ... 19p whose outputs feed a single switching system 20. The switching system is adapted for delivering on an output 35 the processed data from the P amplifiers 19a to 19p in seriatim order. In other words, the switching system 20 strobes all amplifier successively, the time necessary for monitoring all amplifiers being a fraction of the time for which the switch 16 applies the D.C. high voltage from a source 15 to a particular one of the electrodes 13a ... 13i ... 13n. The n × p crossing zones or areas constitute separate receiving cells whch are each activated in succession. The zones associated with the electrode 13a are first monitored. Then the switch 16 connects the following electrode 13b to the high voltage source.

After the zones along the electrode 13n have been monitored, the switch 16 again applies the high voltage to the electrode 13a for another cycle to begin.

The switching system 20 may be as illustrated on FIG. 6, although other constructions are obviously possible. Only amplifier 19a has been illustrated as connected to a data processing channel, although it should be understood that similar channels are associated with each amplifier. The output 30 of the first amplifier 19a is connected to a chopper 31 which receives signals at an appropriate frequency from an outside source (not shown). The signals delivered by the chopper 31 are pulses of predetermined width and amplitude modulated. The frequency fed to the chopper may be the ultrasonic frequency. In that case, synchronous or phase-lock detection is used and renders the system suitable for association with a holographic display system. An integrating system 32 receives the signals from the chopper and the current delivered by the integrator is stored in a storing condenser 23. All condensers 23 are connected to separate inputs of a multiplexer 34 which feeds output 35 of the fast switching system 20.

The time operation of the system is summarized on FIG. 6a. The time is indicated in abscissa. The diagram corresponds to a time duration of 200 microseconds per receiving zone. The chopping signal fed to the chopper 31 is illustrated at the top of the Figure. Beginning with a cycle, there is found a 20 microsecond time period for which a trigger input 36 is at the high logical level (indicated as 1 in the Figure). Then the outside circuit delivers square pulses at a frequency which may be about 0.5 – 3 Mc/s for 80 microseconds, thereby chopping the signal delivered by pulse amplifier 19a. The signal which appears at the output 37 in the chopper is then as schematically illustrated on the second line beginning from the top of FIG. 6a. The integrator 32 provides on its output a signal which is as illustrarted in 38. The voltage delivered by the amplifier increases for the 80 microseconds. After that, there is a slow decreae of the voltage due to the electric leaks. But, due to the presence of a diode 39 between the output of the integrator and the storing capacitor 33, the voltage across the capacitor is as indicated at 40. During the remaining 100 microseconds, the multiplexer 34 strobes the capacitor 33 and provides a corresponding voltage on its output 35. At the beginning of a new cycle, reset means (not shown) short-circuit the capacitor 33 during the initial 20 microseconds for beginning a new cycle.

As an example, a retina has been designed which includes 256 strips on each plate ($n = p = 256$). The multiplexer consisted of 256 programmable unijunction transistors. The chopper and integrator each consisted of a single transistor. As a result, the retina was relatively inexpensive and provided however a precise mapping of the ultrasonic wave field in which it was located.

Figure 3:
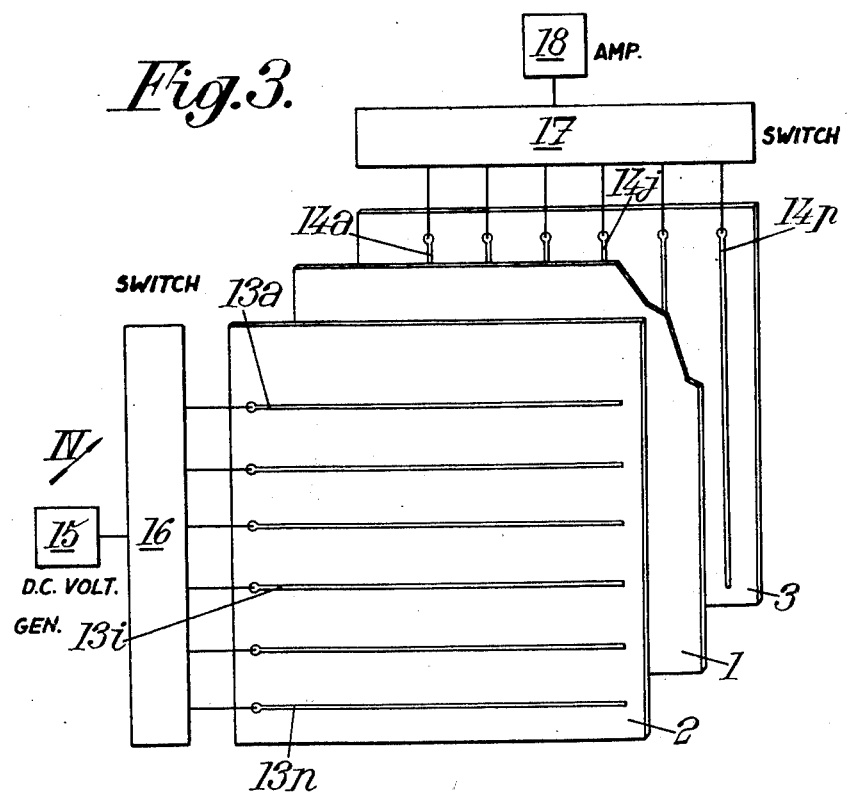
FIG. 3, similar to FIG. 1, is a view of a device according to another embodiment of the invention, suitable for use as a movable ultrasonic receiver with slow scanning.
Figure 4:
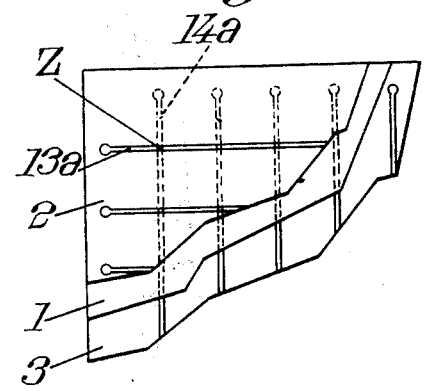
FIG. 4 is a partial view in the direction of arrow 4 of FIG. 3.
Figure 7:
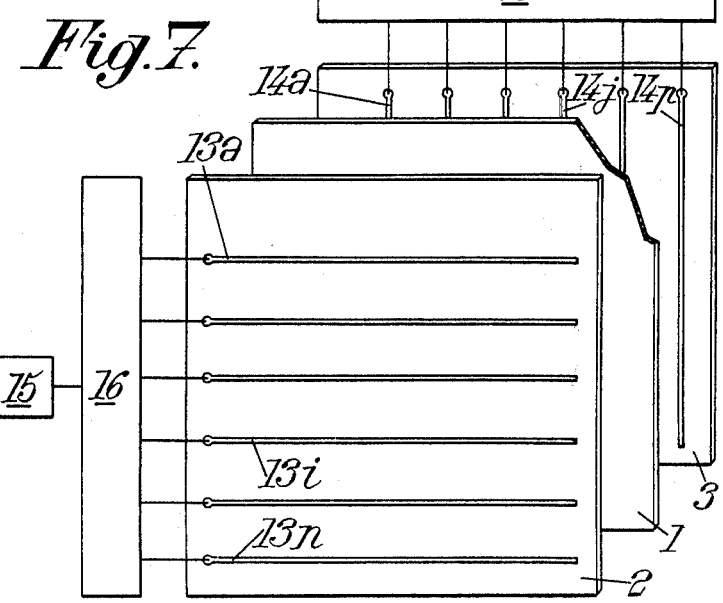
FIG. 7, similar to FIG. 6, is a view of still another embodiment of the invention, particularly suitable for use as a movable source of ultrasonic pulses.

Referring now to FIG. 7, there is shown a slow rate sweep transducer whose construction in similar to that of FIG. 3. The horizontal strips 13a . . . 13n are connected to a high voltage source 15 in sequence by a switching device 16. The vertical conductive strips 14a . . . 14p may be connected in succession to an oscillator 22 by another switching system 21. The operations of the switching systems 16 and 21 is so time-related that all strips 14a . . . 14p are connected in succession to the oscillator for the time during which the switching system 16 maintains one of the strips 13 connected to the source 15. As a result, all individual sources each constituting a crossing zone of a strip 13 and a strip 14 are successively energized. As a result the system operates as a movable ultrasonic wave source. It may be noted that a D.C. potential providing an electric field in the 100 V/micron range is to be preferred in most cases, in all embodiments.

I claim:

1. A device for ultrasonic scanning of transmitted or received ultrasonic wave pulses, comprising: a transducer having a thin sheet of dielectric material tightly packed over its whole active surface in contact with and between the surfaces of an insulating backing plate and a thin insulating protective plate which separates the dielectric sheet from an ultrasonic transmission medium, part at least of the surfaces of both plates in contact with said dielectric material being electrically conductive for constituting separate electrodes, the electrode carried by said backing plate at least being fractioned to constitute at least one array of several conductive areas; and an electric circuit for D.C. electrical biasing of said areas according to a predetermined time sequence, the shape and arrangement of the areas and said time sequence providing a predetermined transmission or reception wave pattern.

2. An electrostatic ultrasonic transducer comprising a rigid stationary insulating backing plate having a first thin surface electrode on one face, a thin sheet of insulating dielectric material in contact with said electrode, a protecting plate having a second thin surface electrode in tight contact with said sheet and separated from said backing plate by said sheet, said sheet of dielectric material tightly packed over is whole active surface between said insulating backing plate and said protective plate means for supplying a biasing D.C. potential between said electrodes, one of said electrodes consisting of an array of strips parallel to a first direction and the other of said electrodes consisting of an array of strips parallel to another direction, and said means comprising switching means for applying said D.C. bias voltage to said strips of one of the electrodes in seriatim order.

3. A transducer according to claim 2, having switch means for connecting the strips of the other of said electrodes to an output in seriatim order, and means for controlling the switching speed for complete scanning to take place during the time for which the D.C. voltage is applied to a same strip of said one electrode.

4. A receiver device for fast scanning of an ultrasonic field, comprising:
an electrostatic ultrasonic transducer including a rigid stationary insulating backing plate having a first thin surface electrode on one face, a thin sheet of insulating dielectric material in contact with said electrode, a protecting plate having a second thin surface electrode in tight contact with said sheet and separated from said backing plate by said sheet, said sheet of dielectric material tightly packed over its whole active surface between said insulating backing plate and said protective plate one of said electrodes comprising an array of strips parallel to a first direction and the other of said electrodes comprising an array of strips parallel to another direction,
switching means for applying a D.C. bias voltage to said strips of one of the electrodes one at a time and in seriatim order, a plurality of processing and signal storing channels, each channel connected to one strip of the other of said electrodes for simultaneous processing of signals received from said last-named strips and storing of said signals, and a multipexer for sequentially scanning said channels and transmitting the stored signals.

5. A device according to claim 4, wherein each said processing channel comprises an amplifier, means for phase lock detection of the signal from the amplifier, integrator means, and means for storage of the peak output of said integrator means.

6. A device according to claim 4, wherein each said channel comprises amplifier means for amplifying the signal received from the corresponding strip, chopper means having a signal input connected to the output of said amplifier means and a second input connected to a source of square pulses at the frequency of the ultrasonic waves to be detected, and a storing capacitor connected to the output of said chopper by means having a unidirectional conductivity.

7. A device according to claim 6, wherein said multiplexer means and said source are so arranged that processing and storage takes place during first fraction of the time period for which a biasing D.C. voltage is impressed to one strip of said one electrode while multiplexing takes place during a second fraction of said time period following the first.

* * * * *